April 14, 1970 G. L. WILDE 3,505,819
GAS TURBINE POWER PLANT
Filed Feb. 5, 1968 2 Sheets-Sheet 1

Inventor
Geoffrey Light Wilde
By
Cushman, Darby & Cushman
Attorneys

United States Patent Office 3,505,819
Patented Apr. 14, 1970

3,505,819
GAS TURBINE POWER PLANT
Geoffrey Light Wilde, Derby, England, assignor to Rolls-Royce Limited, Derby, England, a British company
Filed Feb. 5, 1968, Ser. No. 703,036
Claims priority, application Great Britain, Feb. 27, 1967, 9,300/67
Int. Cl. F02k *3/04;* F04d *29/34*
U.S. Cl. 60—269                              7 Claims

ABSTRACT OF THE DISCLOSURE

The invention concerns gas turbine power plant comprising a main flow duct which has mounted therein, in flow series, compressor means, combustion equipment, turbine equipment, turbine means for driving said compressor means and free turbine means, and a fan duct surrounding the main flow duct. The fan duct has a two-stage fan therein, the stages being mounted on a common rotor and without a stator stage therebetween, the common fan rotor being driven in operation by the free turbine means.

---

This invention concerns gas turbine power plant.

According to the present invention, there is provided a gas turbine power plant comprising an annular main flow duct which has mounted therein, in flow series, compressor means, combustion equipment, turbine means for driving said compressor means and free turbine means, and an annular fan duct at least partly surrounding the main flow duct, said fan duct having at least two fan rotor stages mounted therein, the said fan rotor stages being mounted on a common fan rotor and being arranged without a stator stage therebetween and at such an axial distance apart as to act independently of each other as regards air compression, the said common fan rotor being driven in operation by the said free turbine means.

A stage of outlet guide vanes is preferably provided in the fan duct downstream of the final fan rotor stage, the mean axial distance between said final fan rotor stage and a said outlet guide vane being 2 to 3 times the mean chord length of a blade in said final fan rotor stage.

In one embodiment, the blades of axially successive fan rotor stages are circumferentially staggered with respect to each other by an amount substantially one-half the circumferential distance between adjacent blades of a fan rotor stage.

Preferably the blades of the fan rotor stages are hollow, means being provided therein for boundary layer control.

The free turbine means may include a plurality of radial flow rotor stages.

The compressor-driving turbine means may also include a low pressure and a high pressure axial flow rotor stage which are arranged to contra-rotate in operation.

Preferably the two axial flow turbine rotor stages are arranged without a stator stage therebetween.

The ratio of the mass flow of air in the fan duct to the mass flow of air in the main flow duct is preferably at least 4:1.

Figure 1:
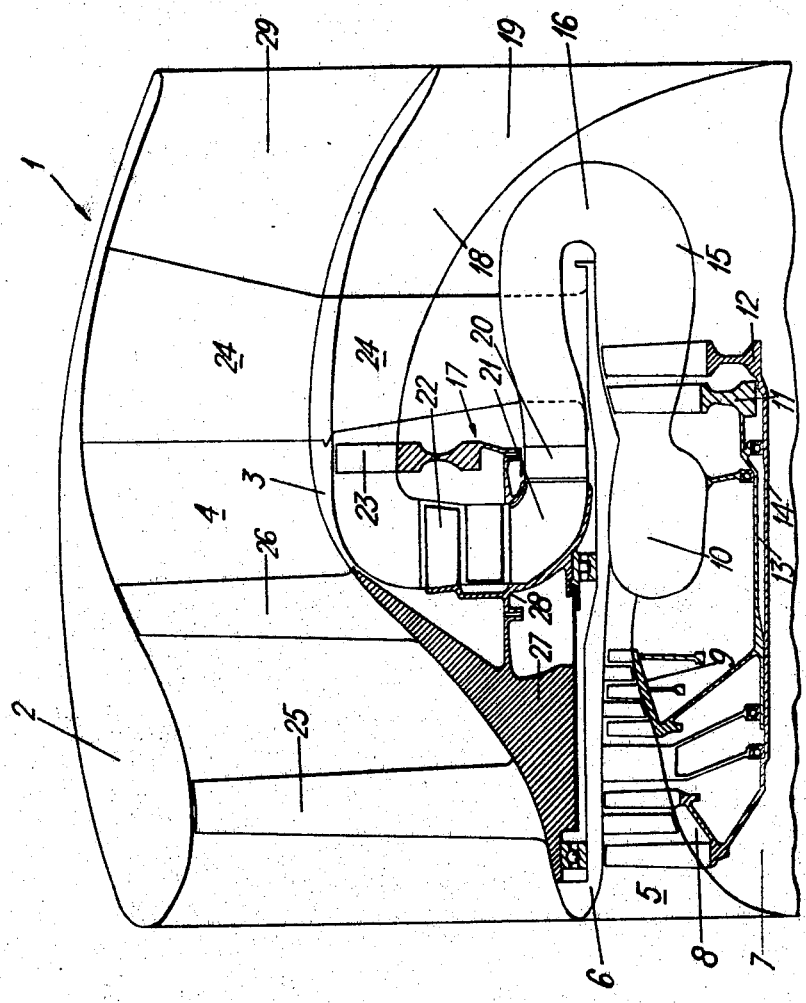
Figure 2:
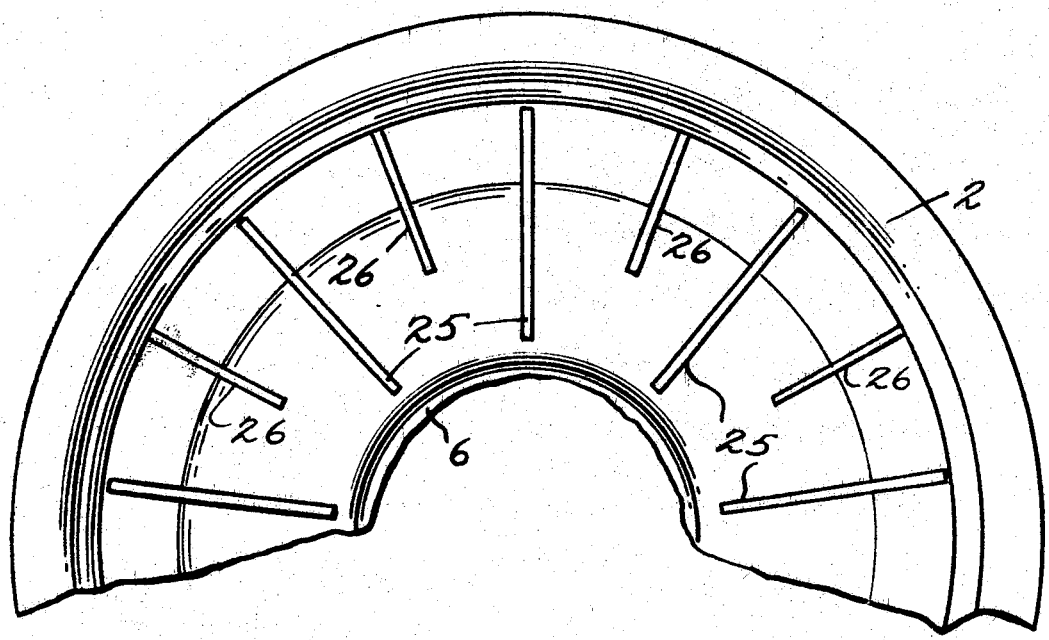

The invention is illustrated, merely by way of example, in the accompanying drawing, in which FIGURE 1 is a diagrammatic, partial longitudinal section, of a gas turbine power plant according to the present invention, and FIGURE 2 is a partial purely diagrammatic front view of the power plant of FIGURE 1.

Referring to the drawing, there is shown a gas turbine power plant 1 which is symmetrical about a longitudinal centre line A—A. The power plant 1 has an outer fan casing 2 and an inner fan casing 3 which define a fan duct 4 therebetween. Radially inwardly of the inner fan casing 3 there is a main flow duct 5 defined between outer and inner casing members 6 and 7 respectively. The upstream end of casing member 6 separates the intakes of the fan duct 4 and the main flow duct 5 from each other.

Mounted in the main flow duct 5, in axial flow series, there is a low pressure compressor 8, a high pressure compressor 9, combustion equipment 10, a high pressure turbine 11 and a low pressure turbine 12. The high pressure turbine 11 drives the high pressure compressor 9 via a shaft 13 which surrounds a shaft 14 drivingly interconnecting the low pressure turbine 12 and the low pressure compressor 8. The shafts 13 and 14 are arranged to rotate in opposite angular senses.

It will be noted that the high and low pressure turbines 11, 12 have no stator stage between them.

In operation, the exhaust gases from the turbines pass into an annular exhaust duct 15 which is S-shaped in section thereby reversing the gas flow in an upstream direction at 16. From 16, the exhaust duct 15 is axially directed until a portion 17 is reached, in which the exhaust duct undergoes a second substantially 180° reversal, terminating in a downstream-facing axial portion 18 and a divergent exhaust nozzle 19.

The upstream end of the portion 17 is provided with a stator stage 20, whence the gases flow through a centrifugal turbine roto stage 21, a radial flow turbine rotor stage 22, and at the downstream end of the portion 17, an axial flow turbine rotor stage 23. Downstream of the turbine 23 there is a stage of outlet guide vanes 24 each of which extends into the fan duct 4 and is secured to the outer fan casing 2 thereby supporting casings 3 and 6.

In the fan duct 4 there are two rotor stages 25, 26 mounted on a common rotor 27. The rotor 27 is journalled in bearings and is secured to a rotor disc 28 on which are mounted the turbine rotor stages 21, 22 and 23. Thus these rotor stages 21, 22 and 23 drive the fan rotor stages 25, 26.

It will be noted that no stator stage or other intermediate stage of blading is provided between the fan rotor stages 25, 26.

Downstream of the fan rotor stage 26 are the outlet guide vanes 24 from which the fan air passes to a fan nozzle 29.

The spacing between the fan rotor stage 26 and the outlet guide vanes 24 is between 2 and 3 times the mean chord length of the blades of the rotor stage 26. The blades of the fan rotor stages 25, 26 are hollow, whereby boundary layer control (e.g. by suction at the blade tips and/or trailing edge blowing) may be exercised.

The arrangement described above will clearly result in an axially short but radially large gas turbine power plant, and will therefore be extremely suitable for use as a vertical lift power plant mounted vertically (i.e. with its longitudinal axis normal to the ground) in an aircraft.

The above described arrangement has a number of features which have been designed to reduce the operational noise level of the power plant. Firstly, the overall noise level decreases as the "by-pass ratio" or the ratio of the fan duct mass flow to the main duct mass flow increases. The described engine may have a by-pass ratio in the range of 4:1 to 16:1, and preferably about 10:1.

Secondly noise is produced by a rotor stage passing through wakes in the gas stream which wakes are caused by a preceding stator stage. It will be noted that there are no stators or other intermediate stage of blading between the fan rotor stages 25, 26 or between the high and low pressure turbines 11, 12. Nor are intake guide vanes provided for the compressors and the fan. It will be noted that in the arrangement according to the present invention, the fan rotor stage 25 is well upstream of the fan rotor stage 26. The rotor stage spacing is thus arranged to be such that the rotor stages 25, 26 act independently of each other as far as air compression is concerned, and since they do not rotate relatively to each other, the wake interaction between the rotors will be substantially eliminated.

Finally, it has been found that the use of two fan rotor stages 25, 26 without intermediate blading provides advantages in the reduction of the axial length of the engine and in noise reduction as compared to single stage fans having very wide chord blades. This is based on the finding that the noise level from the fan is reduced if the mean axial distance between the final fan rotor stage and the outlet guide vanes is between 2 to 3 times the fan rotor blade chord length. Thus by using two stages of "thin" blades (as compared with a single stage fan with wide chord blades) the axial length of the engine is reduced, the said distance being merely 2 to 3 times the chord length of the final rotor stage "thin" blades. Furthermore, as compared with a single stage fan with wide chord blades, the noise is further reduced owing to the fact that the Mach number of the incident air stream on the second fan stage is reduced after passing through the first fan stage, noise being functionally related to Mach number.

In a further arrangement of the present invention, the blades of the fan rotors 25, 26 are arranged in a staggered relationship with each other. In other words, looking axially into the fan duct 4, the blades of the rotor stage 26 would be seen between the blades of the rotor stage 25. The effect of this arrangement is that the outlet guide vane 24 will receive substantially twice the number of wakes than in the case where there is no such staggered relationship and thus the sonic frequency of the noise will also be substantially doubled. As a result, it may be possible to achieve that this frequency becomes ultrasonic so as further to reduce the audible noise level of the power plant.

It will be appreciated that a number of components in the power plant may be fabricated from synthetic resin materials, thereby reducing the overall weight of the power plant.

A number of further modifications are possible within the scope of the invention. Thus the engine in the main flow duct 5 could be a single-shaft engine rather than a two-shaft engine as illustrated. Moreover, the fan rotor arrangement according to the present invention need not be combined with the illustrated reverse-flow arrangement (as shown) in the main duct 5, but could be combined with a gas flow arrangement in which gases from the turbine means are turned radially through substantially 90° and then again through substantially 90° to be exhausted.

I claim:

1. Gas turbine power plant comprising an annular main flow duct which has mounted therein, in flow series, compressor means, combustion equipment, turbine means for driving said compressor means and free turbine means, and an annular fan duct at least partly surrounding the main flow duct, said fan duct having at least two fan rotor stages mounted therein, a common fan rotor on which said fan rotor stages are mounted, the fan rotor stages being arranged without a stator stage therebetween and at such an axial distance apart as to act independently of each other as regards air compression, the said common fan rotor being driven in operation by the said free turbine means.

2. Power plant as claimed in claim 1 wherein a stage of outlet guide vanes is provided in the fan duct downstream of the final fan rotor stage, the mean axial distance between said final fan rotor stage and a said outlet guide vane being 2 to 3 times the mean chord length of a blade in said final fan rotor stage.

3. Power plant as claimed in claim 1 wherein the blades of axially successive fan rotor stages are circumferentially staggered with respect to each other by an amount substantially one-half the circumferential distance between adjacent blades of a fan rotor stage.

4. Power plant as claimed in claim 1 wherein said free turbine means includes a plurality of radial flow rotor stages.

5. Power plant as claimed in claim 1 wherein said compressor driving turbine means also includes a low pressure and a high pressure axial flow rotor stage which are arranged to contra-rotate in operation.

6. Power plant as claimed in claim 5 wherein the two axial flow turbine rotor stages are arranged without a stator stage therebetween.

7. Power plant as claimed in claim 1 wherein the ratio of the mass flow of air in the fan duct to the mass flow of air in the main flow duct is arranged to be at least 4:1.

References Cited

UNITED STATES PATENTS

| 2,526,409 | 10/1950 | Price | 60—226 |
| 2,689,681 | 9/1954 | Sabatiuk | 60—269 |
| 2,998,700 | 9/1961 | Chaplin | 60—269 |
| 3,075,743 | 1/1963 | Sheets | 253—77 |
| 3,194,487 | 7/1965 | Tyler | 253—39 |
| 3,197,124 | 7/1965 | Sallou | 230—134 |
| 3,330,475 | 7/1967 | Dennison | 230—122 |
| 3,363,419 | 1/1968 | Wilde | 60—226 |

FOREIGN PATENTS 180,299   10/1922   Great Britain.

MARK M. NEWMAN, Primary Examiner

D. HART, Assistant Examiner

U.S. Cl. X.R.

60—39.16, 226; 230—116, 134